United States Patent [19]

MacAusland

[11] Patent Number: 6,070,612
[45] Date of Patent: Jun. 6, 2000

[54] SPOUT CONTROLLED MIXING VALVE MECHANISM

[76] Inventor: Samuel S. MacAusland, 58A Colburn Rd., Wellesley, Mass. 02181

[21] Appl. No.: 08/926,538

[22] Filed: Sep. 10, 1997

[51] Int. Cl.[7] .................................................. F16K 11/076
[52] U.S. Cl. .................................... 137/625.41; 137/616.7
[58] Field of Search ........................... 137/625.41, 616.3, 137/616.7

[56] References Cited

U.S. PATENT DOCUMENTS

| | | | |
|---|---|---|---|
| 3,322,152 | 5/1967 | Aechter | 137/625.41 |
| 4,083,383 | 4/1978 | Antoniello | 137/616.7 |
| 4,727,906 | 3/1988 | Holzer | 137/616.7 X |
| 5,685,339 | 11/1997 | Lee | 137/625.41 |

*Primary Examiner*—John Fox
*Attorney, Agent, or Firm*—Scott B. Garrison; Lambert & Garrison PLLC

[57] ABSTRACT

An improved valve mechanism requiring no handle for the direction and intermixing of two or more liquids. The device is extremely suitable for use in sinks such as are commonly found in the kitchen or bathroom. Control of water volume and temperature is accomplished by manipulating the spout itself which acts both as the water outlet and the controller. A swivel spray aerator fixture can be used to redirect the flow back toward the center of the sink or any other location. The device is adapted to be used with ball valve type faucets but others are suitable as well.

4 Claims, 4 Drawing Sheets

SPOUT CONTROLLED MIXING VALVE MECHANISM

BACKGROUND OF THE INVENTION

The present invention relates to the field of valves, faucets or liquid dispensers. More particularly, it relates to an improved valve or faucet which enables mixing or blending a plurality of separate streams of liquid as well as regulate flow rate of the liquid stream from the device by the simple up, down, and lateral movements of its liquid discharge spout. This device eliminates the need to operate knobs or handles for the regulation of flow rate or temperature while also being less expensive to manufacture. In the drawings and in the following description the invention is disclosed as embodied in a hot and cold water mixing faucet. It will be understood, however, that this embodiment is by way of ease of illustration rather than forming a limitation.

Commonly faucets possess knobs or handles to regulate flow and temperature mix of the liquid delivered. One such handle or knob regulates cold water flow and the other regulates hot water flow, proportionally adjusting the two provides the desired temperature mix and flow from the spigot. Perhaps as common are faucets operated by a single lever. Typically these regulate flow rate by lifting the lever upwards, and regulate temperature mix by turning the lever laterally in one direction or the other. In both types, there is a requirement for some manner of valve or faucet which is separate from the spout.

Applicant is aware of two prior art patents which bear more similarity to his invention than the aforementioned types of faucets. However, applicant still considers his invention to be a novel and non-obvious step from these patents thereby placing Applicant's invention into condition for patent protection. The first, Sanchez Aguilar U.S. Pat. No. 4,589,445 describes a spout-operated valve wherein vertical rotation of the spout itself about a horizontal axis results in flow control of the valve. The valve contains passageways in the rotating member and the non-rotating member about which the rotating member rotates. Rotation of the rotating member progresses from non-alignment (and therefore no flow) through full alignment (full flow). The rotation of the one part to the other allows partial alignment of the passageways allowing the user to adjust the flow to the desired rate.

The other patent Siano U.S. Pat. No. 3,468,343 discloses a swinging spout faucet or valve that controls the admix of hot and cold sources. The volume is controlled by pivoting the spout about one end in a vertical plane and the temperature mix is controlled by pivoting the spout about the same end in a horizontal plane. Although Applicant's action of pivoting the spout at first appears identical to Siano, applicant has invented a more reliable, less expensive, and less complicated valve mechanism than disclosed by Siano. Siano uses a complicated series of nested cylinders, which when appropriately raised or lowered, cause the desired flow to occur. In order to translate movement of the spout from a vertical plane to a horizontal plane, a linkage is utilized. One end of the linkage slidingly engages a cylindrical groove machined into one of the cylinders. As the spout is pivoted in the vertical plane, the end of the linkage engaged with the groove rides along the groove resulting in raising or lowering the cylinder appropriately. This action is identical to the action found in threaded rod, screws, or other linear-to-rotational translations relying on the use of an inclined plane. A number of problems are likely to occur with such a mechanism. One such problem is that the mechanism is likely to bind. Binding would occur because the control mechanism (the spout) contacts the temperature mixing mechanism at only a single point. That point is where the slotted plate engages the groove. Such a single point contact is typically insufficient to eliminate binding. Another problem is that the slotted plate could easily slip from the groove entirely. If this were to happen, a person could unwittingly use the device and have no immediate outward indication that the device was effectively broken. Admittedly, this would not be a serious problem unless the temperature mixing mechanism were to have slipped from the slotted plate during a 100% hot water condition and subsequently a child or elderly person unknowingly used the device, at which time they could be seriously scalded since there would be no indication that the device was broken. However such a device having once slipped, would be more apt to slip on a regular basis simply due to wear in the slotted plate or groove thereby rendering the faucet unusable.

Other problems Applicant seeks to overcome which both Sanchez Aguilar and Siano have in common, is that manipulation of the spout through any plurality of positions causes by default a displacement of the liquid stream from some origin. In the case of a sink, the displacement of the water stream is toward a sidewall of the sank rather than approximately aligned with the sink drain. Additionally, because each spout above is typically made of a heat conducting material, i.e., metal, and serves as the temperature control, any further manipulations of the spout require the user to contact the now heated spout surface. Furthermore, these devices do not protect the user from heat conducted through the metal spout when the user manipulates the spout to affect flow or temperature.

SUMMARY OF THE INVENTION

As such what is needed is a valve that regulates both volume and temperature by use of the valve spout. Such a valve would be both safe to use, economical to manufacture, and lack the complexity associated with alternative prior art valves performing similar functions. The present Applicant has developed such a valve. It is further believed that this Applicant's valve provides both a new and non-obvious resolution to the problems associated with prior art valve mechanisms and as such Applicant believes his idea to be a patentable improvement over this other prior art.

Applicant's device uses a spout to control both flow of liquid and mixing. Flow is controlled by pivoting the spout about its attachment in a vertical direction, whereas mixing is controlled by pivoting in a horizontal direction. As mentioned above, the presently described embodiment is extremely suitable for hot and cold water faucets, where one liquid is hot water and the other, cold water. The applicant has utilized a number of different mechanisms to overcome the limitations discussed above. Applicant has conceived a completely new valve configuration which incorporates the advantages of a ball valve and adapts the ball portion to permit the spout itself to regulate flow and liquid admixing. However, Applicant contends that his invention can be suitably adapted to three current styles of faucet mechanisms. These current styles are the ball valve, the ceramic disk, and the cartridge type mechanism. However, Applicant considers the use of a ball valve to be readily adaptable into a spout controlled valve assembly. Applicant has found that his embodiment eliminates a great deal of the deficiencies discussed above regarding Siano. Because there are fewer moving parts and no linkages, the Applicant's invention is less likely to fail than would Siano. Furthermore, should Applicant's device fail, the relative location of the spout in relation to the sink fixture upon which it is mounted would provide an instant visual indication as to what temperature and flow condition in which the valve failed. Should liquid flow be reestablished, the user would know what to expect based upon the spout's position. This is because there are no internal linkages which could fail thereby placing the spout in a position not reflecting the characteristic volume and temperature of the liquid flow should it be reestablished.

The Applicant utilizes a swiveling spray aerator fixture at the water discharge end of the spout. The swiveling spray aerator can be adjusted irrespective of the spout position. This adjustability enables a user to redirect the spray stream toward the center of the sink or toward whatever position the user desires. Additionally, it serves as a convenient location to grasp and thereby control the flow and temperature. By making the swiveling spray aerator fixture of plastic or some other minimally heat conducting material, the user avoids scalding his or her hand on the spout itself.

It is therefore an object of this invention to provide an improved device which allows for both flow control and admixing of at least two separate streams of liquid by manipulation of the liquid discharge spout.

It is another object of the present invention to provide an improved mechanism to accomplish the above object, by utilizing a ball valve as the controlling means.

It is another object of the present invention to provide a location which is essentially thermally non-conductive thereby enabling a user to grasp the spout which may be hot due to the passage of a hot liquid therethrough without risking a burn.

It is still another object of the present invention to provide a cost effective, economically produced device which is both mechanically reliable and eliminates the majority of problems associated with prior art valves of similar purposes.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawing.

DETAILED DESCRIPTION OF THE PREFERRED EMBODIMENT

Figure 1:
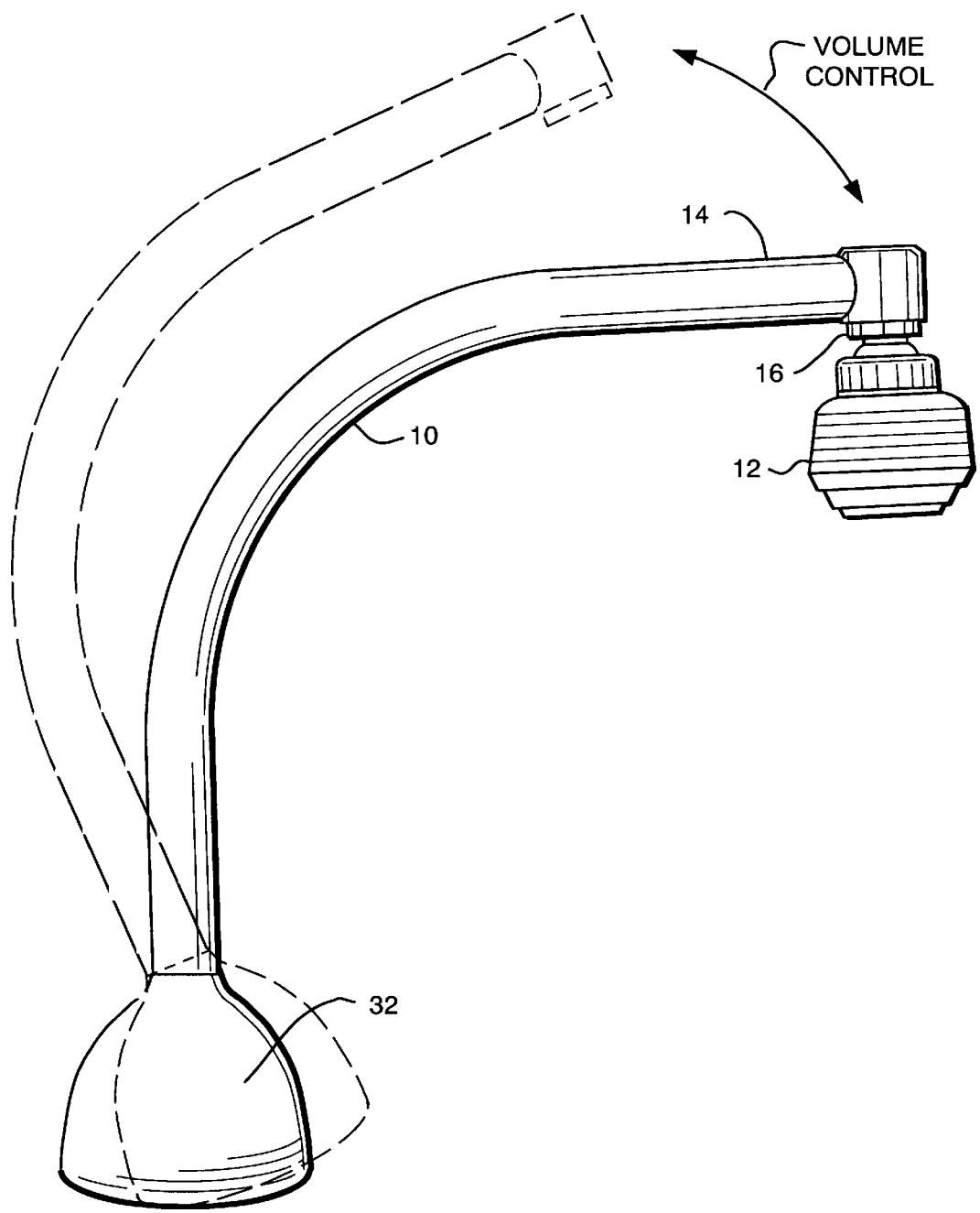
FIG. 1 shows a side perspective view of a preferred embodiment of spout controlled mixing faucet with a swiveling spray aerator fixture, the phantom view further illustrates that the spout can be moved in an arc about its base.
Figure 2:
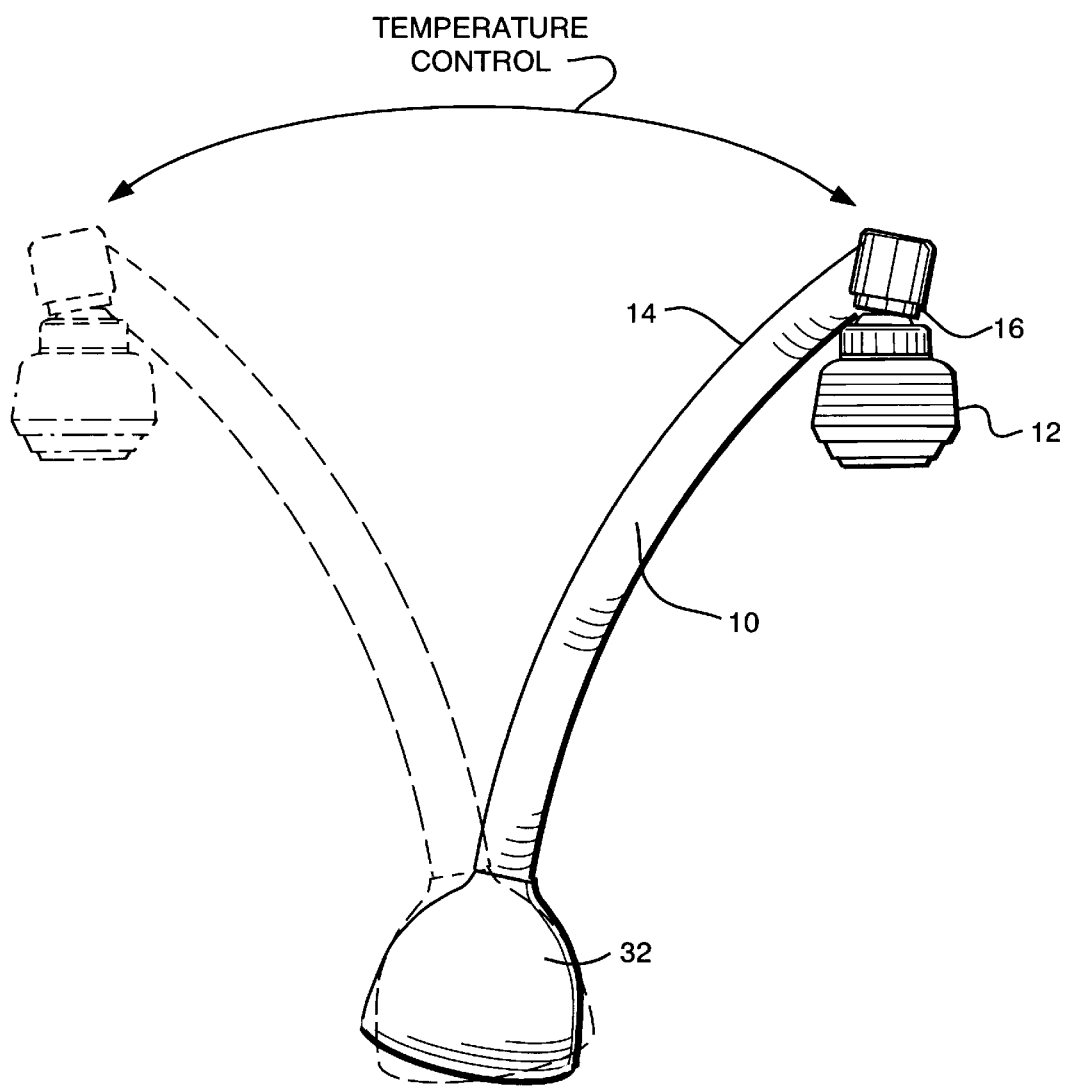
FIG. 2 depicts a frontal elevation of the FIG. 1 spout, again the phantom view illustrates that the spout can be moved in an arc about its base.

With reference to FIGS. 1 and 2, one preferred embodiment of a spout controlled faucet 10 is depicted. The spout controlled mixing faucet 10 is suitably adapted to receive a swiveling spray aerator fixture 12 as depicted, which may or may not be used. The combination of the two, however, provide the ability to control both the admixing of at least two liquids and the flow of the resulting combined liquid as well as to direct said combined liquid to a target area. Another important advantage of the use of such a swiveling spray aerator fixture is that it provides a thermally non-conductive location for a user to grasp while manipulating the device. It being specifically understood that such a mixing faucet could be used to mix a large number of liquids, each of such liquids potentially possessing vastly different characteristics. However, with that being said, Applicant's device preferably serves as a faucet to mix hot and cold water at a sink such as those customarily found in a kitchen, bathroom, or utility room.

The spout controlled mixing faucet 10 includes a spout 14, preferably of the swan neck type as depicted in FIGS. 1 and 2, however other types of spouts are easily adapted to the present invention and are considered a part of it as well. Spout 14 has a spout discharge end 16 which as stated above is adapted to receive a swiveling spray aerator fixture 12. Looking specifically at FIGS. 3 and 4, a rotating ball 18 having two liquid inlet ports, depicted as ports 20 and 22 on FIG. 4; one for hot water, the other for cold. Each of the liquid inlet ports are capable of communication with their respective hot and cold water supplies. By aligning either or both liquid inlet ports with their respective water supplies one can control both the temperature of the admixed water and the volume of flow. This is not new in the art and therefore further explanation is considered unnecessary. Applicant's ball valve differs in that where normally a ball valve contains a valve stem, Applicant's ball valve contains a hollow stem 24. Within the hollow stem 24 is a central passage 26. The internal construction of rotating ball 18 is that the liquid inlet ports 20 and 22 converge within the rotating ball 18 and thence lead to the central passage 26. Central passage 26 communicates with a spout inlet end 30. Many ball forms exist in the art, but their commonality is that each combines separate flowpaths into a single flowpath within the ball. Therefore, any form of ball is considered appropriate so long as it is modified to have a hollow stem 24.

Figure 3:
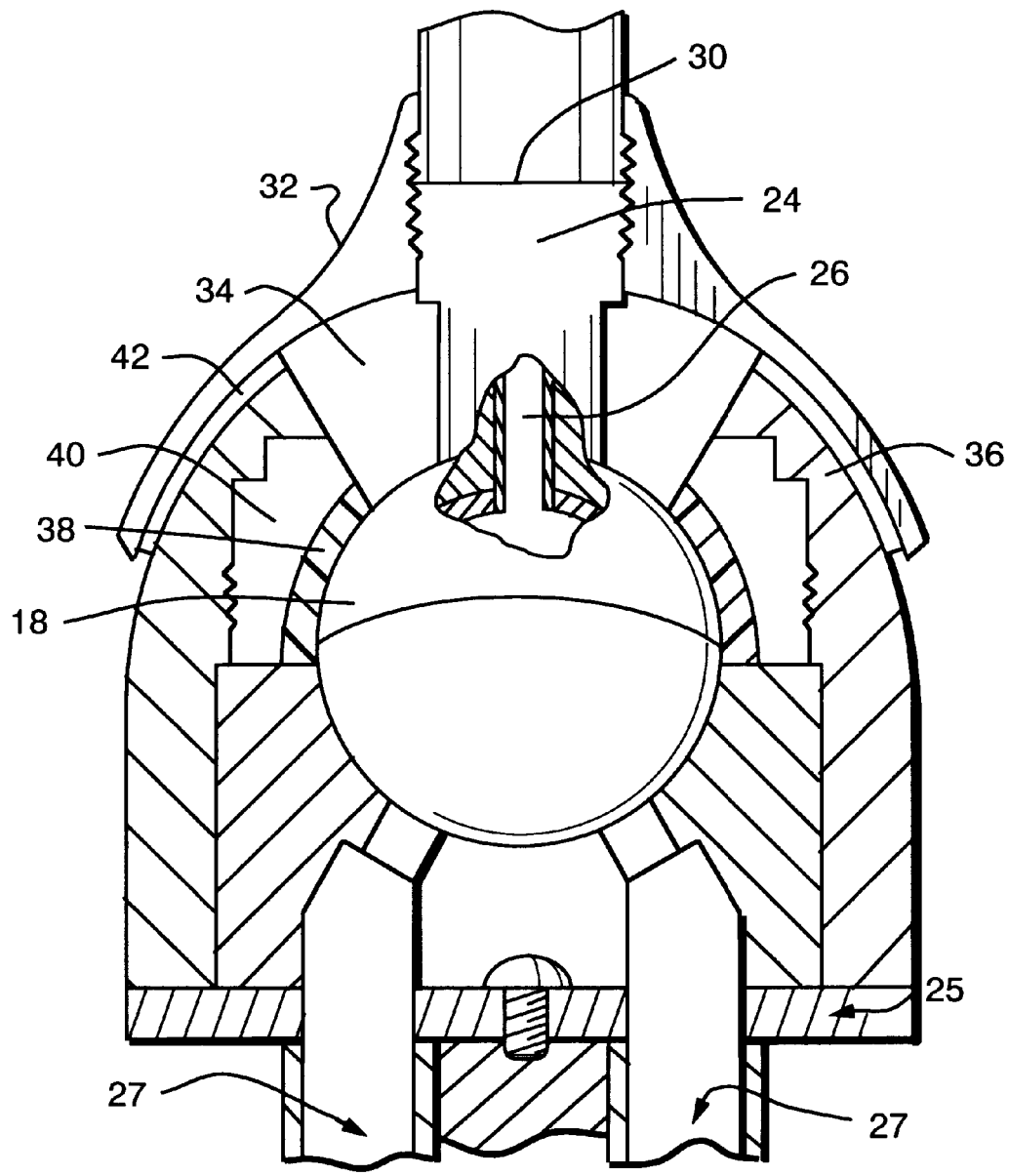
FIG. 3 depicts in a section view one preferred ball valve volume and admixing mechanism enabling the FIG. 1 spout controlled mixing faucet to properly function.
Figure 4:
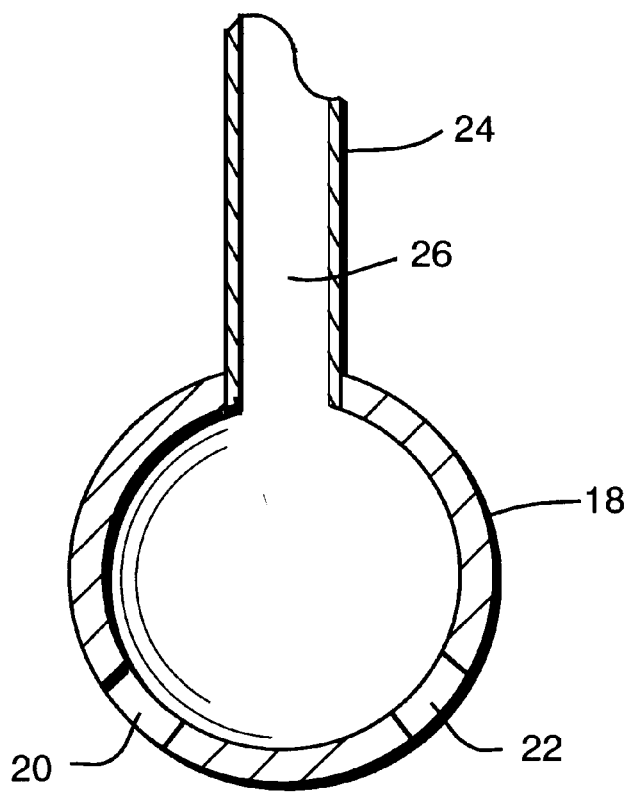
FIG. 4 is a cutaway of one type of ball for the FIG. 3 ball valve.

As can be seen in FIG. 3, the rotating ball 18 is free to rotate within its seat limited by its contact with other portions of the device as referred to below. The ball 18 must be able to permit alignment of the liquid inlet ports with their respective hot and cold water supplies in a no-flow condition, a one hundred percent (100%) hot water condition, and a one hundred percent (100%) cold water condition. Of course there exists a multiplicity of flow volume and temperature conditions within these boundaries which the apparatus must be capable of obtaining. This is easily understood and is nothing new in the field of ball valves. Attached to an exterior portion of the hollow stem 24 is a skirt 32. The skirt 32 serves to cover and therefore protect a chamber 34 from potential impact by foreign material. The chamber 34 provides a space within which the hollow stem 24 is allowed to move about.

In one preferred embodiment, the rotating ball 18 is held within the device by a valve cap 36. Interposed between the valve cap 36 and the rotating ball 18 is a gland 38 and a gland retainer ring 40. Gland 38 places a continuous pressure on the ball 18 so as to ensure adequate seal between the liquid inlet ports and the water supplies. Gland 38 further serves to reduce the coefficient of friction which would otherwise be greater were the valve cap 36 and the rotating ball 18 to come into direct contact. The material selected and the type of construct for gland 38 is common in the field of valve design. To maintain a constant downward directed pressure on ball 18, gland retainer ring 40 is provided which can be intermittently tightened as needed. Both gland retainer ring 40 and valve cap 36 must be structured to enable adequate rotation of ball 18, therefore sufficient space should be provided for hollow stem 24 to rotate within the parameters specified above. To provide smooth action and even wear of the entire assembly, at least one of the contacting surfaces of valve cap 36 or skirt 32 could be coated with a friction reducing coating 42. One substance providing the desired features is Teflon. Other means could be employed to ensure that the ball remains in proper contact with its water supplies which do not incorporate all of the above items, the valve cap 36, the gland 38 and the gland retainer ring 40; however, the ball 18 must be held into the device and the hollow stem 24 must be able to rotate within chamber 34.

Use of the apparatus is similar to that found in single handle faucets containing ball valves. The major exception being that no handle is provided in the Applicant's invention, the spout 14 acting as the handle. As such, a user would manipulate spout 14 multi-directionally; in a forward and backward direction from said user's perspective to regulate flow rate or volume of water. To regulate admixing of liquid, or specifically temperature of water in a sink faucet, the user would manipulate the spout 14 in a side-to-side manner. Of course as is typical of most ball valves, the range of motion can move in a plurality of combinations of forward-to backward and side-to side motions. One problem Applicant noted with the use of such an apparatus was that the direction of liquid discharge stream from the spout discharge end 16 was determined by the relative placement of the spout discharge end 16 within the sink. Applicant overcame this problem by the addition of swiveling spray aerator fixture 12 which enables the user to redirect the liquid discharge stream to a location other than where the spout discharge end 16 would otherwise direct it. However, perhaps more importantly, this swiveling spray aerator fixture 12 provides a convenient location for the user to grasp the spout without fear of thermally conducting the heat from the metal spout to the user's hand because the swiveling spray aerator fixture 12 should be made of a material having properties of low thermal conductivity. Such a material could be plastic.

Figure 5:
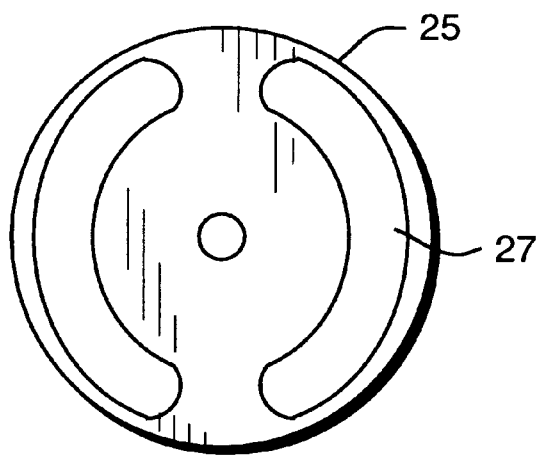
FIG. 5 is a top elevation view of a swivel plate used in the FIG. 1 embodiment.

To further increase the liquid spray coverage of the device, a swivel plate 25 as depicted in FIGS. 3 and 5 is needed upon which the assembly is mounted. This swivel plate 25 enables the entire valve mechanism to swivel over a range thereby enabling the user to further direct the flow of liquid. The swivel plate 25 has two arcuate slots 27 which align with the hot and cold water supplies at a portion just below the valve mechanism. By configuring the slots as arcs, it can be seen that the valve mechanism can be swiveled without cutting off the water supply.

Applicant has also envisioned manufacturing this device by adapting a cartridge type valve and a ceramic disk type valve to redirect the liquid discharge up into spout inlet end 30. Applicant also has contemplated an embodiment of such a valve which combines the features of a ball valve, a cartridge type valve, and a ceramic disk valve.

As such the method of making and using the device detailed above constitute the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these other embodiments may be resorted to without departing from the invention. Therefore the form of the invention set out above should be considered illustrative and not as limiting the scope of the following claims.

What is claimed is:

1. A spout controlled mixing valve mechanism comprising:

a spout having a discharge end and an inlet end;

a ball containing at least three internal passages therein and having a tubular extension perpendicular to an outer surface of said ball, wherein one of said internal passages extends through said tubular extension and comprises an outlet port in communication with said inlet end of said spout, wherein a remainder of said passages comprise inlet ports flush with said outer surface of said ball, each of said inlet ports engagingly and disengagingly communicate with a dedicated liquid supply;

a seat upon which said ball pivots and rotates having bores therethrough for passage of liquid from said liquid supplies; and a slotted swivel plate for receiving on its uppermost surface said seat wherein the slots in said swivel plate align with the bores in said seat;

wherein manipulation of said spout is transferred to said ball via said spout's connection to said tubular extension causing at least one of said inlet ports to pivotally interact with that inlet port's liquid supply throughout a range between fully open to fully closed; and wherein said seat swivels upon said swivel plate over a range within which said bores are not occluded by said slots.

2. A spout controlled mixing valve mechanism in accordance with claim 1 wherein there are two of said inlet ports, one engagingly and disengagingly in communication with a cold water supply, the other engagingly and disengagingly in communication with a hot water supply.

3. A spout controlled mixing valve mechanism in accordance with claim 2 wherein said ball is hollow and said internal passages encompass the entire interior portion of said ball.

4. An improved sink faucet of the type having a single water outlet and a single mechanism for the control of intermixing of hot and cold water and the volume of the intermixed hot and cold water, wherein the improvement comprises:

a ball having a tubular extension radially extending therefrom, wherein said tubular extension forms a conduit from a juncture of said hot and cold water inlets;

a pivotable and rotatable spout; said spout forms a user controllable outlet for the intermixture of said hot and cold water, wherein said spout moves in multiple directions and each position of said spout correlates to a specific volume and temperature of water from said outlet of spout;

a swiveling spray aerator fixture at said outlet of spout for both redirecting flow within a sink with which said device is associated and providing an insulated location for a user to grasp said outlet of spout; and a swivel plate mounted to a bottommost portion of said device, wherein said swivel plate has two arcuate slots which allow passage of hot and cold water respectively therethrough, and swiveling of said faucet about said swivel plate enables the entire device to move without impacting said passage of two fluids therethrough.

* * * * *